Figure 1:
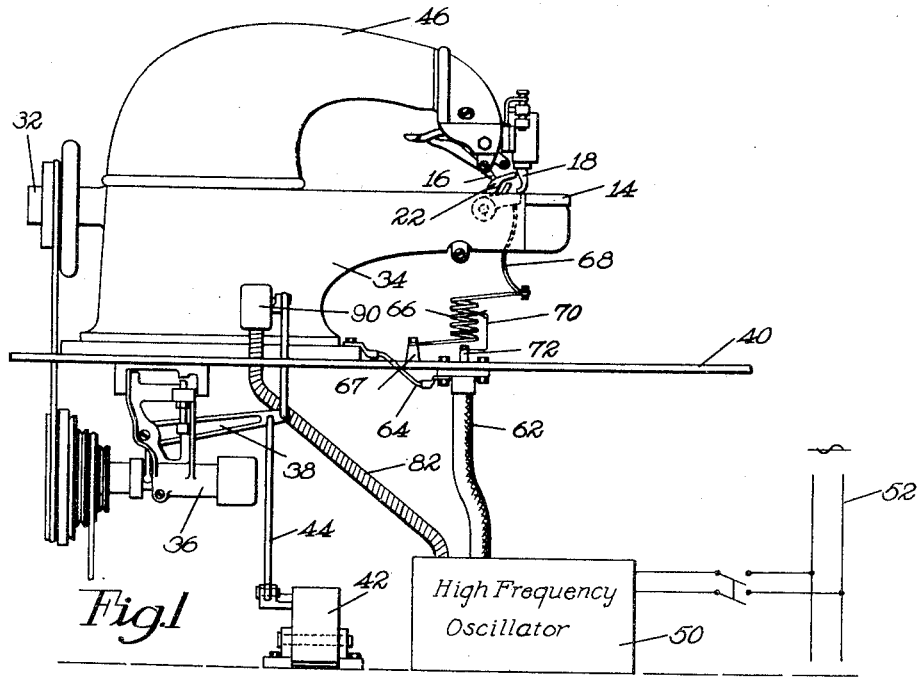

Dec. 27, 1949     M. F. ASHLEY     2,492,347
PROGRESSIVE ELECTRONIC BONDING
MACHINE USING STRAY FIELDS
Filed June 22, 1946

*Inventor*
Merwin F. Ashley
By his Attorney
Thomas J. Gaw

Patented Dec. 27, 1949

2,492,347

UNITED STATES PATENT OFFICE 2,492,347

PROGRESSIVE ELECTRONIC BONDING MACHINE USING STRAY FIELDS

Merwin F. Ashley, Arlington, Mass., assignor to United Shoe Machinery Corporation, Flemington, N. J., a corporation of New Jersey Application June 22, 1946, Serial No. 678,577

4 Claims. (Cl. 12—55)

This invention relates to the bonding, progressively, of layers of dielectric material and is herein illustrated as embodied in a shoe-upper-folding machine of the type illustrated in Letters Patent of the United States No. 2,270,891, granted January 27, 1942, on the application of C. A. Newhall.

In certain aspects the machine herein shown is covered more broadly in claims in an application of George T. Hart, Serial No. 679,994, filed June 28, 1946, who is the prior inventor of the subject-matter thus claimed. That application is assigned to the same assignee as is this application.

The bonding of layers of dielectric material may be carried out progressively with great advantage when the work pieces have curved outlines, because of the greater ease of handling the work and the fact that machines of this type are adapted for treating all shapes of work pieces. Some types of dielectric materials such as vinyl plastics may be bonded one to another by setting up heat at the interface, as by the application of a high-frequency electrostatic field, so as to soften the materials themselves sufficiently to cause them to adhere when pressed together. Similar results and advantages are obtained with non-plastic materials when an activatable adhesive such as a thermoplastic or a thermosetting cement is applied to one or both of the layers to be bonded. In the case of a thermoplastic cement, it would be applied to the work, allowed to dry and then activated progressively as the work is guided past a heating device. The application of heat is sometimes effected by heating a metallic member which forms part of the work handling mechanism of the machine and delivers the heat directly to the surface to be activated by radiation or conduction. Still other heating devices, of which hot-air blowers constitute one example, are common in the shoe-upper-folding art.

It is therefore an important object of the invention to devise an improved machine for bonding dielectric materials progressively by applying to the area to be treated a high-frequency field for generating heat directly at the interface without heating any part of the machine or subjecting the operator to the discomfort of heat or danger of burns in manually guiding the work.

Advantageously, this bonding may be effected, in accordance with a feature of the invention, by a machine having an intermittent feed mechanism and electrodes positioned both at the same side of the work arranged to set up a stray field passing through at least one layer of the work to set up heat at the interface. In accordance with still another feature of the invention, such stray-field electrodes are embodied in a part of the work-treating instrumentalities such, for example, as a mechanism for intermittently feeding the work.

Still other features of the invention reside in the provision of electrodes in one of the instrumentalities of a folding machine by means of which the margin of the work is bent over and then pressed down upon the body of the work and, by reason of the novel mechanism, is bonded thereto progressively as it is carried through the machine. In the illustrated embodiment, an insulated electrode is positioned in the face of the anvil forming part of the fold-pressing mechanism. This insulated electrode cooperates, in setting up a high-frequency electrostatic field, with another electrode which may be a part of the anvil itself. As shown, this second electrode is connected to the low-voltage side of the source of supply of high-frequency power.

Figure 3:
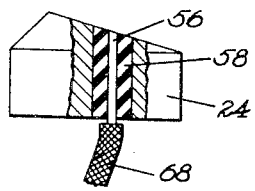
Figure 2:
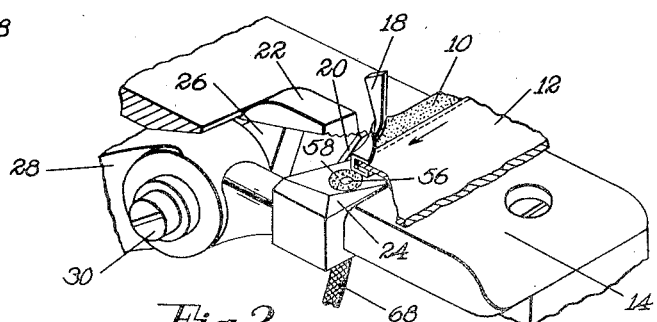

These and other features of the invention will best be understood from a consideration of the following specification taken in connection with the accompanying drawings, in which Fig. 1 is a rear elevation of a folding machine embodying the invention;

Fig. 2 is an angular view of a fragment of the machine, provided with a modified gage for French binding work, and showing particularly the folding instrumentalities as seen from the rear; and Fig. 3 is an end elevation of the anvil of the machine, broken away to show an insulated electrode.

The illustrated mechanism with the gage modified as in Fig. 2 to a form similar to that illustrated in Letters Patent of the United States No. 1,850,979 granted March 22, 1932, upon the application of George E. Williamson is designed for the folding and bonding of a so-called French binding 10 of ribbon-like material which has been stitched to the margin of a shoe upper 12 and in which said binding has previously been coated with a thermoplastic material capable of activation in a high-frequency field, it will be understood that the invention is not limited to French binding work but may be used with any kind of sheet material so long as it is thermoactive at its surface. In machines of the type illustrated, the work is carried over a support 14, being positioned thereon by an edge guide 16, as in the Newhall patent, when used for folding the margin of the work itself or with a gage 17 (Fig. 2), as in the Williamson patent, when used for French binding. The work is held against the support by a presser foot 18 which serves as a creaser for cooperation with a reciprocable folding finger 20 by means of which the fold is formed ready to be completed by the action of a hammer and anvil mechanism. The latter mechanism, which serves also to feed the work, comprises a hammer 22 which cooperates with the upper face of an anvil electrode 24 to press the folded margin against the body of the work and to hold it in pressed position while the hammer and anvil together are oscillated about a horizontal axis to feed the work toward the observer in Figs. 1 and 2 a short distance of the order of one eighth of an inch. A hammer-carrying arm 26 is mounted on an anvil-carrying arm 28 by a pivot pin 30 and, by mechanism described in the aforementioned Newhall patent, a repeated cycle of movement is imparted to these instrumentalities by reason of power delivered to a driving shaft 32 mounted in a base 34 and connected by a belt to a transmission mechanism 36 embodying a starting and stopping lever 38. The base 34 and the mechanism 36 are mounted on a bench 40. This lever is connected to a treadle 42 by a treadle rod 44, and it will be understood that the treadle has been turned through 180° for convenience of illustration although, in the actual use of the machine, the operator will face the side of the machine which is away from the observer. Mechanism for operating the folding finger 20 and the hammer and anvil mechanism is carried in the base 34 of the machine which also carries the work support 14, while the edge gages 16 or 17 and the presser foot 18 are supported upon an overhanging arm 46 attached to the base and constructed as illustrated in said Newhall patent.

The bonding operation must be effected by the production of heat at the interface between the completely folded binding and the body of the work, such as the shoe upper 12, for example, in a previously applied thermoplastic which has been allowed to dry until it is hard and non-tacky upon the obverse face of the binding 10. This thermoplastic can readily be activated in situ by a stray field passing through the lower layer or layers of the work to treat the interface. The production of the stray field is effected by power supplied from a high-frequency oscillator 50 which receives power from commercial power mains 52 and delivers it through a coaxial cable 62 to electrodes in one part of the feed mechanism, such as the anvil 24.

Of these, one electrode 56 comprises a rod mounted in a block 58 of insulating material which is carried in a recess in the anvil 24, and the other electrode 24 is constituted by the anvil itself. Together, they set up a stray or fringe field above the anvil, which extends along the line of feed of the work, this line being indicated by the arrow in Fig. 2. A connection is effected between these electrodes and the oscillator 50 by using a coaxial cable 62 the upper end of which is suspended from the table 40. The casing of the cable is connected to the low-voltage side of the output terminals of the oscillator and, at its upper end, is grounded on the frame of the machine and hence on the anvil electrode 24, by a conductor 64. A matching inductance coil 66 is supported by an insulator 67 on the table and is connected at its upper end to the electrode 56, as by a flexible braid 68. An adjustable connection 70 is provided between the core 72 of the cable and a point on the coil. The core is joined to the high-voltage side of the output terminals of the oscillator. The matching inductance 66 serves to foreshorten the transmission line between the oscillator and the load and, by the transforming action of the foreshortened line, the impedance of the load is caused to match the impedance of the oscillator so that a maximum amount of energy will be delivered to the load. A resulting stray field will be set up between the central electrode 56 and the surrounding material of the anvil 24 and will theoretically assume a shape similar to the upper half of a substantially horizontal torus.

The possibility of adjusting the length of the feeding step to the dimensions of the field will be clear so that any one area of a piece of work may be subjected to a shorter or longer activating treatment as it passes over the anvil. Obviously, where the feeding step is equal to or less than the feedwise dimension of the field, a continuous seam will result. It will also be understood that the hammer 22 may be made of a suitable dielectric material to avoid any undesirable disturbance of the stray field by the hammer when in its gripping position.

A switch 90 suitably connected to the oscillator 50 by conductors 82 is arranged to render that oscillator ineffective to deliver high-frequency power to the electrodes when the treadle 42 is released and the feeding movements stopped. By this means, any danger of "over-cooking" of the work is avoided.

In the use of the machine, the operator will handle the work in exactly the manner to which he has been accustomed when presenting it to folding machines with other types of heating apparatus. It will be recalled, however, that, inasmuch as no heat is set up in any part of the machine, he is not required to be cautious in order to avoid burns. Further, the high-tension electrode 56 is not readily contacted. Each successive portion of the work will be subjected to the action of the folding instrumentalities comprising the folding finger 20, the coacting combined presser and creaser foot 18, and the coacting hammer and anvil 22, 24 by means of which the fold is completed and the upturned margin is brought down into contact with the work and bonded thereto by the action of the stray field set up above the anvil. The length of time during which any portion of the work remains in the field will be determined by the relation between the dimensions of that field, the speed of the machine and the length of the feed step, which latter is determined by an adjustment provided in such machines to control the angle of oscillation of the hammer and anvil and not herein specifically described. If the margin of the body of the work is to be folded, then, a slightly different type of gaging and folding mechanism, such as that illustrated in the Newhall patent, will be provided. Some utilization has been made of plastic sheet material for the construction of shoe uppers and, with such material, no adhesive coating will usually be necessary, but the bonding will take place just as in the previously described operation by reason of heat generated in the material at the interface between the folded margin and the body of the work itself. The reference in the claims to an activatable surface upon the work is intended to apply equally well to sheet material carrying an activatable adhesive and to sheet material, such as in some plastics, the surface of which is activatable, usually without special treatment, by the use of heat.

Having thus described my invention, what I claim as new and desire to secure by Letters Patent of the United States is:

1. In a machine for bonding contacting layers of sheet material by the production of heat at the interface by means of a high-frequency electrostatic field, a member positioned beneath the work, means for moving said member back and forth in the direction of feeding movement of the work, an electrode positioned in said member and insulated therefrom, said member having means for cooperation with said electrode to set up a stray field intersecting at least the lower layer of the work, thereby to produce heat at the interface, and means for intermittently pressing the work against said member, whereby the work is pressed and fed while it is treated by said stray field.

2. In a folding machine for shoe parts along the margin of which a coating of thermoplastic cement has been applied and allowed to dry, means for forming a fold in said cemented margin, hammer and anvil work-gripping members for also completing the fold, means for operating said hammer and anvil members to grip the work and then feed it step by step, and electrodes embodied in one of said members for setting up a high-frequency electrostatic field bulging toward the other member thereby to intersect and activate the cement as the fold is completed.

3. In a folding machine for shoe parts along the margin of which a coating of thermoplastic cement has been applied and allowed to dry, means for forming a fold in said cemented margin, hammer and anvil means for completing the fold, means for operating said hammer and anvil means to feed the work step by step, and electrodes embodied in the anvil for setting up a stray field above the anvil which will activate the cement while the work is being fed.

4. In a folding machine for shoe parts along the margin of which a coating of thermoplastic cement has been applied and allowed to dry, means for forming a fold in said cemented margin, a member positioned beneath the work, means for moving said member back and forth in the direction of feeding movement of the work, an electrode positioned in said member and insulated therefrom, said member having means for cooperation with said electrode to set up a strap field intersecting at least the lower layer of the work, thereby to produce heat at the interface, and means for intermittently pressing the work against said member, whereby the work is pressed and fed while it is treated by said stray field.

MERWIN F. ASHLEY.

REFERENCES CITED

The following references are of record in the file of this patent:

UNITED STATES PATENTS

| Number | Name | Date |
|---|---|---|
| 2,270,891 | Newhall | Jan. 27, 1942 |

OTHER REFERENCES

Publication "RCA Radio Service News," April, 1944, page 4. Copy available in 154–42K.